United States Patent
Lee et al.

(10) Patent No.: US 8,016,900 B2
(45) Date of Patent: Sep. 13, 2011

(54) CARBON MONOXIDE REMOVER AND REFORMER FOR FUEL CELL

(75) Inventors: Sung Chul Lee, Yongin-si (KR); Ju Yong Kim, Seoul (KR); Yong Kul Lee, Yongin-si (KR); Man Seok Han, Yongin-si (KR); Chan Ho Lee, Yongin-si (KR); Jin Kwang Kim, Yongin-si (KR); Jin Goo Ahn, Yongin-si (KR); Dong Uk Lee, Yongin-si (KR); Leonid Gorobinskiy, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 758 days.

(21) Appl. No.: 11/827,946

(22) Filed: Jul. 12, 2007

(65) Prior Publication Data

US 2008/0152966 A1 Jun. 26, 2008

(30) Foreign Application Priority Data

Jul. 28, 2006 (KR) .................. 10-2006-0071738

(51) Int. Cl.
*H01M 8/04* (2006.01)
(52) U.S. Cl. ....................... 48/127.9; 429/400
(58) Field of Classification Search ........... 48/61–118.5, 48/127.9; 422/129–242; 429/12–46
See application file for complete search history.

(56) References Cited

U.S. PATENT DOCUMENTS

| | | | |
|---|---|---|---|
| 2002/0146604 A1* | 10/2002 | Matoba | 429/20 |
| 2003/0010481 A1* | 1/2003 | Northrop | 165/168 |
| 2003/0093950 A1 | 5/2003 | Goebel et al. | |
| 2005/0164046 A1 | 7/2005 | Fujihara et al. | |
| 2005/0175532 A1 | 8/2005 | Yamaguchi et al. | |
| 2005/0227129 A1 | 10/2005 | Iio | |
| 2006/0039839 A1* | 2/2006 | Zhao et al. | 422/198 |
| 2006/0204800 A1* | 9/2006 | Kamijo | 429/20 |

FOREIGN PATENT DOCUMENTS

| | | |
|---|---|---|
| JP | 2001-023675 | 1/2001 |
| JP | 2001-172003 | 6/2001 |
| JP | 2001-206702 | 7/2001 |
| JP | 2003-081609 | 3/2003 |

(Continued)

OTHER PUBLICATIONS

Korean Office Action issued May 28, 2007 in counterpart Korean Patent Application No. 10-2006-0071738.

(Continued)

*Primary Examiner* — Alexa Neckel
*Assistant Examiner* — Imran Akram
(74) *Attorney, Agent, or Firm* — Knobbe, Martens, Olson & Bear LLP

(57) ABSTRACT

Disclosed are a carbon monoxide remover and a fuel cell reformer including the same. In the reformer, a reformed gas produced from a reforming reaction unit when the reformer is initially driven is used as a fuel for a heat source unit supplying heat to a water gas shift reaction unit. The carbon monoxide remover is connected to the reforming reaction unit that changes fuel into reformed gas with hydrogen. The carbon monoxide remover lowers carbon monoxide contained in the reformed gas. The carbon monoxide remover includes a heat source unit employing the reformed gas as a fuel; and a water gas shift reaction unit provided with a shift catalyst using heat from the heat source unit. The shift catalyst lowers the concentration of carbon monoxide in the reformed gas through reaction between water and carbon monoxide.

14 Claims, 4 Drawing Sheets

FOREIGN PATENT DOCUMENTS

| | | |
|---|---|---|
| JP | 2003-243018 | 8/2003 |
| JP | 2004-234941 | 8/2004 |
| JP | 2005-353347 | 12/2005 |

OTHER PUBLICATIONS

European Search Report dated Sep. 28, 2007 in counterpart European Patent Application No. 07110032.5 in 7 pages.

Notice of Allowance issued Aug. 31, 2007 in counterpart Korean Patent Application No. 10-2006-0071738.

Communication dated Oct. 6, 2010, in related European Patent Application No. 07110032.5.

* cited by examiner

CARBON MONOXIDE REMOVER AND REFORMER FOR FUEL CELL

CROSS-REFERENCE TO RELATED APPLICATIONS

This application claims the benefit of Korean Patent Application No. 10-2006-0071738, filed on Jul. 28, 2006, in the Korean Intellectual Property Office, the disclosure of which is incorporated herein by reference.

BACKGROUND

1. Field

The present invention relates to a fuel cell, and more particularly, to a carbon monoxide remover and a reformer used for a fuel cell.

2. Description of the Related Technology

A fuel processor includes a reforming reaction unit and a water gas shift reaction unit. The reforming reaction unit is also referred to as a reformer. The reforming reaction unit is configured to reform fuel into reformed gas containing hydrogen gas. The water gas shift reaction unit is configured to remove undesired gas components other than the hydrogen gas from the reformed gas produced in the reforming reaction unit. The reforming reaction unit needs heat to start a reforming reaction because the reforming reaction using a catalyst is an endothermic reaction. In general, the reforming reaction unit receives heat from an external heat source such as an electric heater using electricity generated by a fuel cell, or a heater using an oxidation catalyst resulting in an exothermic reaction.

In a reformer using methanol as fuel, when methanol and water are reacted in the reforming reaction unit at a constant temperature, hydrogen and carbon dioxide gases are produced by an endothermic reaction, as shown in the following Reaction Equation 1.

$$CH_3OH + H_2O \leftrightarrow CO_2 + 3H_2 \qquad \text{Reaction Equation 1}$$

The products produced in the reforming reaction unit contain an undesired gas such as carbon monoxide. Such carbon monoxide may contaminate a catalyst provided in a stack and reduce the lifespan of the fuel cell. Thus, there is a need to minimize the concentration of carbon monoxide in the reformer. The water gas shift reaction unit serves to lower the concentration of carbon monoxide.

SUMMARY OF CERTAIN INVENTIVE ASPECTS

One aspect of the invention provides an apparatus, comprising: a reactor comprising an inlet and an outlet, the inlet being configured to receive hydrocarbon, the outlet being configured to discharge a mixture comprising hydrogen gas, carbon dioxide and carbon monoxide; a carbon monoxide remover configured to receive the mixture and remove or convert at least part of the carbon monoxide of the mixture; and a heater configured to heat the carbon monoxide remover, wherein the heater is configured to receive the mixture from the reactor and use the mixture to generate heat.

The apparatus may further comprise a valve connecting the outlet of the reactor to the carbon monoxide remover and the heater and configured to selectively direct the mixture between the carbon monoxide remover and the heater, wherein the apparatus further comprises a controller configured to control operation of the valve. The apparatus may further comprise a timer configured to measure time, and wherein the controller is configured to control the operation of the valve using the time measured by the timer.

The apparatus may further comprise a temperature sensor configured to measure temperature of the mixture at the outlet, temperature of the reactor or temperature of the carbon monoxide remover, and the controller may be configured to control the operation of the valve using the temperature measured by the temperature sensor. The apparatus may further comprise a concentration sensor configured to measure concentration of carbon monoxide in the mixture, and the controller may be configured to control the operation of the valve using the concentration measured by the concentration sensor.

The apparatus may be configured to transfer the mixture discharged from the outlet to the heater for a predetermined period of time from initiation of the reactor, and the apparatus may be further configured to transfer the mixture to the carbon monoxide remover after the predetermined period. The apparatus may be configured to transfer the mixture discharged from the outlet to the heater until the carbon monoxide reaches a predetermined level of concentration in the mixture, and the apparatus may be further configured to transfer the mixture to the carbon monoxide remover after the carbon monoxide reaches the predetermined level of concentration.

The apparatus may be configured to transfer the mixture discharged from the outlet to the heater until the carbon monoxide remover reaches a predetermined temperature, and the apparatus may be further configured to transfer the mixture to the carbon monoxide remover after the carbon monoxide remover reaches the predetermined temperature. The apparatus may be configured to transfer the mixture discharged from the outlet to the heater until the mixture at the outlet of reactor reaches a predetermined temperature, and the apparatus may be further configured to transfer the mixture to the carbon monoxide remover after the mixture at the outlet reaches the predetermined temperature.

The heater may be connected to the outlet of the reactor so as to selectively receive the mixture from the outlet. The apparatus may further comprise a manifold connecting the outlet of the reactor to the carbon monoxide remover and the heater, wherein the manifold comprises at least one valve configured to selectively direct the mixture from the outlet to the carbon monoxide remover or to the heater. The at least one valve may be controlled to selectively direct the mixture based on at least one of operation of the reactor and operation of the carbon monoxide remover.

The apparatus may further comprise a manifold connecting the outlet of the reactor to the carbon monoxide remover and the heater, wherein the manifold comprises at least one valve configured to distribute the mixture from the outlet between the carbon monoxide remover and the heater. The heater may be further configured to receive a fuel other than the mixture so as to generate heat using the fuel. The apparatus may be selected from the group consisting of a self-contained fuel cell system, a fuel cell reformer module, an electronic or electrical device comprising a fuel cell, and a transportation vehicle comprising a fuel cell.

The apparatus may further comprise another carbon monoxide remover configured to process a resulting mixture from the carbon monoxide remover and to further remove at least part of carbon monoxide from the resulting mixture. The heater may comprise an oxidation catalyst to facilitate an oxidation reaction to generate heat.

Another aspect of the invention provides a method of warming up a carbon monoxide remover for use with a fuel cell, the method comprising: providing a mixture comprising hydrogen gas and carbon monoxide; oxidizing at least part of the mixture, thereby generating heat; and applying the heat to warm up a carbon monoxide remover.

Another aspect of the invention provides a method of operating an apparatus described above. The method comprises: receiving the mixture from the reactor and use the mixture to generate heat; and applying the heat to warm up the carbon monoxide remover.

Yet another aspect of the invention provides an apparatus comprising: an inlet configured to receive a mixture comprising hydrogen gas, carbon dioxide and carbon monoxide; a carbon monoxide remover configured to receive the mixture from the inlet and further configured to remove at least part of the carbon monoxide from the mixture; a heater configured to heat the carbon monoxide remover, wherein the heater is configured to receive the mixture from the inlet and use the mixture to generate heat; and a valve located between the inlet and the carbon monoxide remover and further between the inlet and the heater, wherein the valve is configured to selectively direct the mixture between the carbon monoxide remover and the heater.

The apparatus may further comprise a controller configured to control operation of the valve. The controller may be configured to control the operation of the valve based on one or more selected from the group consisting of time from initiation of operation of the apparatus, time from receipt of the mixture at the inlet, temperature of the mixture at the inlet, and concentration of carbon monoxide in the mixture received through the inlet.

Another aspect of the invention provides a carbon monoxide remover in which reformed gas produced in a reforming reaction unit when a reformer is initially driven is used as fuel for a heat source required for water gas shift reaction such that fuel efficiency is improved and starting time is shortened, and a reformer used for a fuel cell and including the same to thereby enhance system efficiency.

Another aspect of the invention provides a carbon monoxide remover connected to a reforming reaction unit that changes fuel into reformed gas with abundant hydrogen, and lowering carbon monoxide contained in the reformed gas, the carbon monoxide including: a heat source unit employing the reformed gas as fuel; and a water gas shift reaction unit provided with a shift catalyst using heat from the heat source unit and lowering the concentration of carbon monoxide in the reformed gas through reaction between water and carbon monoxide.

Another aspect of the invention provides a reformer for a fuel cell, including: a reforming reaction unit that changes fuel into reformed gas with abundant hydrogen; a heat source unit employing the reformed gas from the reformed reaction unit as fuel; and a water gas shift reaction unit provided with a shift catalyst using heat from the heat source unit and lowering the concentration of carbon monoxide in the reformed gas through reaction between water and carbon monoxide.

BRIEF DESCRIPTION OF THE DRAWINGS

These and/or other aspects and advantages of the invention will become apparent and more readily appreciated from the following description of embodiments, taken in conjunction with the accompanying drawings of which.

DETAILED DESCRIPTION OF CERTAIN INVENTIVE EMBODIMENTS

Hereinafter, certain embodiments according to the instant disclosure will be described with reference to accompanying drawings.

In one embodiment, a water gas shift reaction unit uses a catalytic reaction which is conducted at a temperature of about 200° C. Therefore, a heat source is needed to increase the temperature of the water gas shift reaction unit while the fuel cell is in operation.

The water gas shift reaction unit may be positioned adjacent to a reforming reaction unit. Heat generated in the reforming reaction unit is used to heat the water gas shift reaction unit. However, when the water gas shift reaction unit is adjacent to the reforming reaction unit and uses heat from the reforming reaction unit, the reforming reaction unit has a temperature of about 700° C. that is much higher than the temperature of about 200° C. required for the water gas shift catalyst reaction. Thus, it is difficult to control the temperature of the water gas shift reaction unit. Further, when the high temperature heat generated in the reforming reaction unit is used to heat the water gas shift reaction unit, the catalyst provided in the water gas shift reaction unit may be deteriorated, thereby reducing the lifespan of the reformer.

Alternatively, an electric heater using electricity generated by the fuel cell may be used for heating the water gas shift reaction unit. However, because the electric heater is used to supply heat to the water gas shift reaction unit, the electricity generated by the fuel cell is consumed, thereby lowering the efficiency of the fuel cell.

In another method, a fuel may be oxidized by an oxidation catalyst, and the water gas shift reaction unit may be heated by oxidation heat from the oxidation reaction. However, this method does not have good fuel efficiency as it consumes a significant amount of fuel.

Figure 1A:
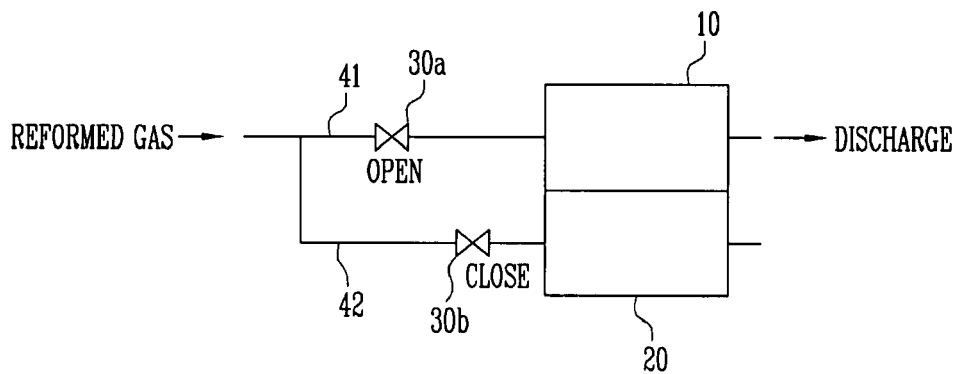
FIGS. 1A and 1B are block diagrams of a carbon monoxide remover employed in a reformer for a fuel cell according to a first embodiment.
Figure 1B:
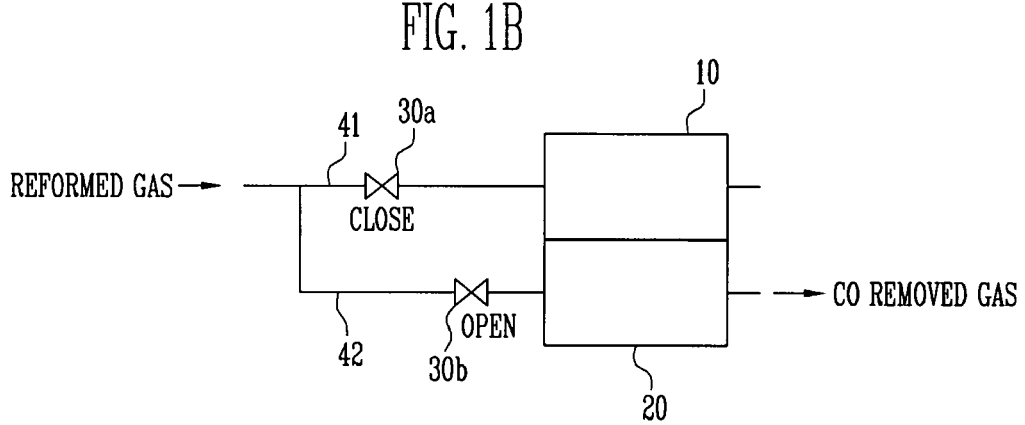

FIGS. 1A and 1B are block diagrams of a carbon monoxide remover employed in a reformer for a fuel cell according to a first embodiment. Referring to FIGS. 1A and 1B, a carbon monoxide remover according to the first embodiment includes a heat source unit 10, a water gas shift reaction unit 20, and first and second valves 30a and 30b.

The heat source unit 10 generates heat by oxidizing a reformed gas introduced from a reforming reaction unit with an oxidation catalyst. The water gas shift reaction unit 20 includes a shift catalyst which can be activated by heat from the heat source unit 10. The water gas shift reaction unit 20 is configured to lower the concentration of carbon monoxide contained in the reformed gas by reaction between water and carbon monoxide. The first and second valves 30a and 30b control the amount of the reformed gas supplied to the heat source unit 10 and the water gas shift reaction unit 20.

In the illustrated embodiment, the reforming reaction unit is coupled with the carbon monoxide remover within a reformer for a fuel cell. The reforming reaction unit allows a steam reforming reaction between fuel and steam to occur at a high temperature, thereby generating the reformed gas containing carbon monoxide by thermal equilibrium.

The heat source unit 10 may contain the oxidation catalyst for oxidizing the reformed gas to generate heat. Examples of the oxidation catalyst include, but are not limited to, $PdAl_2O_3$, NiO, CuO, $CeO_2$, $Al_2O_3$ and any other suitable oxidation catalysts that include at least one of Pu, Pd, Pt and methane.

Further, the water gas shift reaction unit 20 may contain the shift catalyst for reacting carbon monoxide from the reformed gas with water to produce hydrogen and carbon dioxide. Examples of the shift catalyst include, but are not limited to, an alumina or zirconium dioxide support impregnated with at least one of Cu, Zn, Fe and Cr.

When the reformer is initially driven, the carbon monoxide remover controls the first valve 30a to open a channel of a first pipe 41 connecting the reforming reaction unit and the heat source unit 10. At the same time, the carbon monoxide remover controls the second valve 30b to close a channel of a second pipe 42 connecting the reforming reaction unit and the water gas shift reaction unit 20, thereby supplying the reformed gas from the reforming reaction unit only to the heat source unit 10. When a predetermined period of time elapses after the beginning of driving the reformer for the fuel cell, the first valve 30a is closed and the second valve 30b is opened, so that the reformed gas is supplied from the reformed reaction unit to the water gas shift reaction unit 20.

According to an embodiment, at the beginning of driving the reformer for the fuel cell, the reformed gas has a carbon monoxide gas in a concentration which is too high to be used for the water gas shift reaction unit 20. The reformed gas is instead used as a fuel for the heat source unit 10 supplying heat to the water gas shift reaction unit 20. Thus, the fuel efficiency of the reformer can be enhanced, and the water gas shift reaction unit 20 can be quickly preheated.

Figure 2:
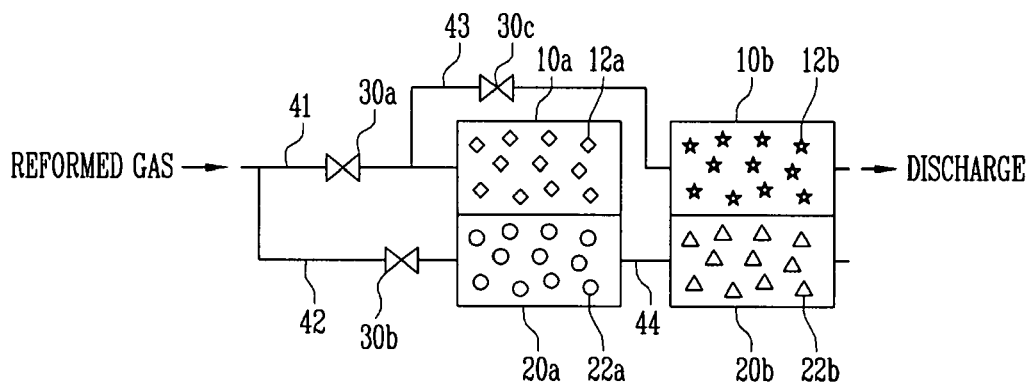
FIG. 2 is a block diagram of a carbon monoxide remover employed in a reformer for a fuel cell according to a second embodiment.

FIG. 2 is a block diagram of a carbon monoxide remover employed in a reformer for a fuel cell according to a second embodiment. Referring to FIG. 2, the carbon monoxide remover according to the second embodiment includes a high temperature water gas shift reaction unit 20a and a low temperature water gas shift reaction unit 20b. The high temperature water gas shift reaction unit 20a is positioned between the reforming reaction unit and the low temperature water gas shift reaction unit 20b. In the high water gas shift reaction unit 20a, a reaction occurs at a temperature of about 350° C. to about 450° C. This configuration enhances the efficiency of reducing carbon monoxide.

In the illustrated embodiment, the carbon monoxide remover according to the second embodiment includes a heat source unit including a high temperature heat source unit 10a and a low temperature heat source unit 10b. The water gas shift reaction unit includes the high temperature water gas shift reaction unit 20a and the low temperature water gas shift reaction unit 20b. The high temperature heat source unit 10a corresponds to a first heat source unit in a high temperature reaction unit of the carbon monoxide remover. The high temperature water gas shift reaction unit 20a corresponds to a first water gas shift reaction unit in the high temperature reaction unit. The low temperature heat source unit 10b corresponds to a second heat source unit of a low temperature reaction unit. The low temperature water gas shift reaction unit 20b corresponds to a second water gas shift reaction unit of the low temperature reaction unit. In this embodiment, the high temperature water gas shift reaction unit 20a and the low temperature water gas shift reaction unit 20b are connected through a pipe 44.

The first heat source unit 10a contains a first oxidation catalyst 12a for oxidizing the reformed gas so as to generate heat. The first water gas shift reaction unit 20a contains a temperature shift catalyst 22a for reacting fuel with water at a temperature of about 350° C. to about 450° C. so as to remove carbon monoxide in the reformed gas. The second heat source unit 10b contains a second oxidation catalyst 12b for oxidizing the reformed gas so as to generate heat. The second water gas shift reaction unit 20b contains a low temperature shift catalyst 22b for reacting fuel with water at a temperature of about 200° C. to about 250° C. so as to further remove carbon monoxide in the reformed gas.

The high temperature shift catalyst 22a can include any suitable high temperature catalyst such as $Fe_3O_4$, $Cr_2O_3$, etc., which are usable at a temperature of about 500° C. or higher. The low temperature shift catalyst 22b can include any suitable low temperature catalyst such as CuO, ZnO, $Al_2O_3$, etc., which are usable at a temperature of about 200° C. or higher.

When the reformer is initially driven, the reformed gas from the reforming reaction unit is supplied as a fuel to the first heat source unit 10a via the first pipe 41 with the first valve 30a. At the same time, the reformed gas is also supplied as a fuel to the second heat source unit 10b via a third pipe 43 branched from the first pipe 41 and provided with a third valve 30c. Then, the reformed gas is oxidized by the oxidation catalysts 12a and 12b in the respective heat source units 10a and 10b, thereby generating heat. The generated heat is used in the reaction of the shift catalysts 22a and 22b of the respective water gas shift reaction units 20a and 20b.

In the carbon monoxide remover according to the second embodiment, when the second water gas shift reaction unit 20b of the low temperature reaction unit has a temperature of about 150° C. or higher, optionally about 200° C. or higher, the third valve 30c is closed to stop supplying the reformed gas to the second heat source unit 10b. When the first water gas shift reaction unit 20a of the high temperature reaction unit has a temperature of about 300° C. or higher, optionally about 350° C. or higher, the first valve 30c is closed to stop supplying the reformed gas to the first heat source unit 10a. Then, the second valve 30b provided in the second pipe 42 is opened to supply the reformed gas to the first water gas shift reaction unit 20a so that the reformed gas passes through the first and second water gas shift reaction units 20a and 20b and reacts with the water gas shift catalysts 22a and 22b, thereby allowing the reformed gas to have a desired concentration of carbon monoxide.

Figure 3A:
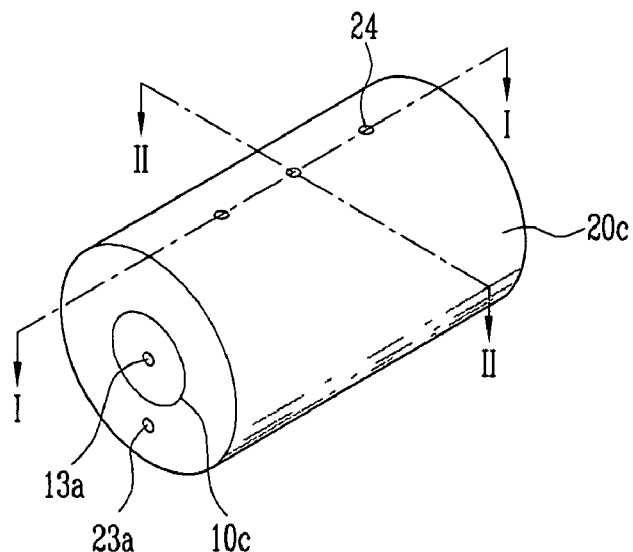
FIG. 3A through 3C illustrate a carbon monoxide remover employed in a reformer for a fuel cell according to a third embodiment.
Figure 3B:
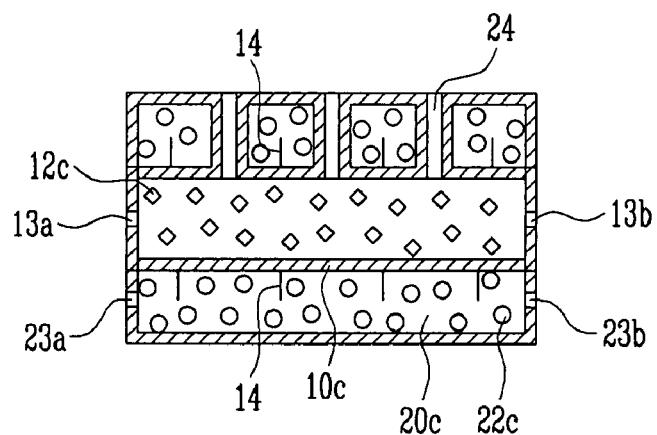
Figure 3C:
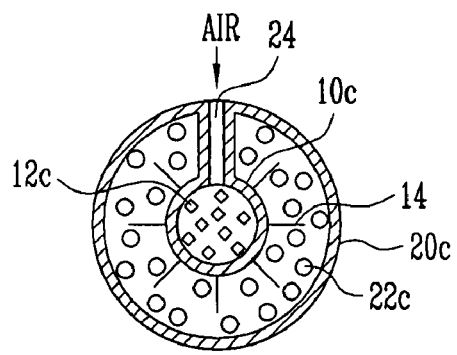

FIG. 3A through 3C illustrate a carbon monoxide remover employed in a reformer for a fuel cell according to a third embodiment. FIG. 3A is a perspective view of the carbon monoxide remover. FIG. 3B is a cross-sectional view of the carbon monoxide remover, taken along the line I-I of FIG. 3A. FIG. 3C is a cross-sectional view of the carbon monoxide remover, taken along the line II-II of FIG. 3A.

Referring to FIGS. 3A through 3C, the carbon monoxide remover according to this embodiment has a double cylindrical structure. The carbon monoxide remover includes a water gas shift reaction unit 20c which surrounds a cylinder-shaped heat source unit 10c. In the illustrated embodiment, the heat source unit 10c and the water gas shift reaction unit 20c are coaxially aligned in the cylindrical structure. Such a double cylindrical structure can efficiently transfer heat from the heat source unit to the water gas shift reaction unit as compared with other flat type structures or the like.

The heat source unit 10c forms an inner cylinder in the double cylindrical structure. The heat source unit 10c contains an oxidation catalyst 12c and generates heat by a reaction between the reformed gas and the catalyst. Further, the water gas shift reaction unit 20c forms an outer cylinder in the double cylindrical structure. The water gas shift reaction unit 20c contains a shift catalyst 22c for the water gas shift reaction.

The heat source unit 10c has a first side having an inlet 13a for the reformed gas, and a second side opposite from the first side and having an outlet 13b for discharging combustion gas produced by burning the reformed gas. Further, the water gas shift reaction unit 20c has a first side having an inlet 23a for receiving the reformed gas, and a second side opposite from the first side and discharging the reformed gas having a lower concentration of carbon monoxide than the reformed gas.

The heat source unit 10c includes a plurality of air holes 24 formed by penetration from the heat source unit 10c through the water gas shift reaction unit 20c. The air holes 24 allow the heat source unit to communicate with the outside so as to receive external air. The air introduced into the heat source unit 10c through the air holes 24 is used in the catalyst reaction for oxidizing the reformed gas.

According to the third embodiment, an external surface of an inner pipe body forming the heat source unit 10c includes a plurality of protrusions 14 in order to effectively transfer heat from the heat source unit 10c to the water gas shift reaction unit 20c. The protrusions 14 extend from the heat source unit 10c toward the inside of the water gas shift reaction unit 20c, and facilitate heat transfer from the heat source unit 10c to the water gas shift reaction unit 20c. The protrusions 14 uniformly transfer heat to the water gas shift reaction unit 20c, thereby enhancing the efficiency of the shift catalyst 22c. Here, the protrusions 14 can have a pin structure to be screw-coupled to the external surface of the heat source unit body or may be integrally formed with the external surface of the heat source unit body.

Meanwhile, the inlet 23a and the outlet 23b provided in the opposite sides of the water gas shift reaction unit 20c can face each other, but not limited thereto. Alternatively, the inlet 23a and the outlet 23b may be eccentrically aligned with the heat source unit 10c therebetween. In such an embodiment, the path length of the reformed gas introduced into the water gas shift reaction unit 20c is longer than that of when the inlet 23a and the outlet 23b coaxially face to each other, thereby enhancing the efficiency of removing carbon monoxide from the reformed gas.

Figure 4:
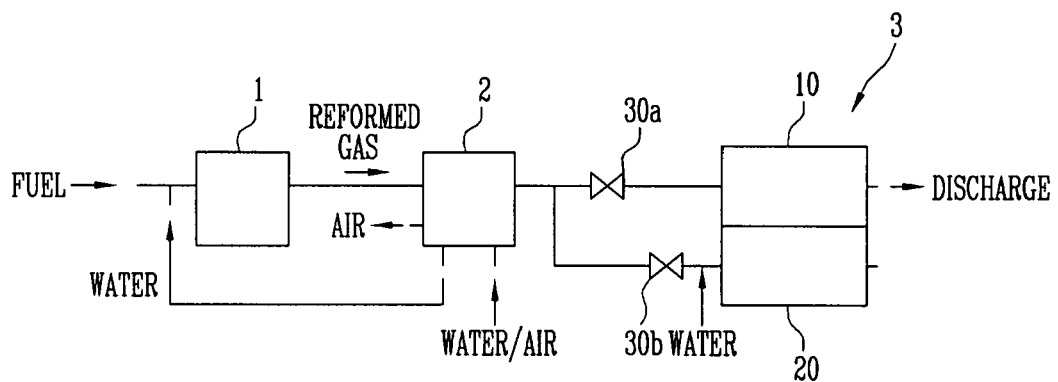
FIG. 4 is a block diagram of a reformer for a fuel cell according to a fourth embodiment.

FIG. 4 is a block diagram of a reformer for a fuel cell according to a fourth embodiment. Referring to FIG. 4, the reformer for the fuel cell according to this embodiment includes a reforming reaction unit 1, a cooler 2, and a carbon monoxide remover 3. A reformed gas flows out from the reforming reaction unit 1, and is cooled while passing through the cooler 2. The reformed gas is then supplied to the carbon monoxide remover 3. In the fourth embodiment, the temperature of the reformed gas passing through the reforming reaction unit 1 is lowered by the cooler 2. In the illustrated embodiment, the reformed gas coming out from the reforming reaction unit 1 has a high temperature of about 600° C. to about 800° C. The temperature of the reformed gas is lowered to about 200° C. to about 250° C. suitable for the water gas shift reaction of the carbon monoxide remover 3. This configuration prevents the catalyst of the carbon monoxide remover 3 from damage.

In one embodiment, the reforming reaction unit 1 includes a steam-reforming reaction unit that generates a reformed gas by reacting fuel with water through a catalyst reaction. The temperature of the reforming reaction unit 1 can be varied depending on the kinds of fuel. For example, butane is employed as a fuel. Further, the reforming catalyst of the reforming reaction unit 10 can include nickel or ruthenium.

In the reforming reaction unit 1, the steam-reforming reaction between the fuel and steam occurs at a temperature of about 600° C. to about 800° C. The reformed gas contains carbon monoxide in an amount of about 4 volume % to about 10 volume % with reference to the total volume of the reformed gas because of the thermal equilibrium. The steam-reforming reaction of the reforming reaction unit 1 employing butane as the fuel can be represented as the following reaction Equation 2. In the reaction Equation 2, carbon monoxide produced by the reaction between butane and water is omitted.

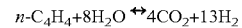

$$n\text{-}C_4H_4 + 8H_2O \leftrightarrow 4CO_2 + 13H_2 \qquad \text{Reaction Equation 2}$$

At the beginning of driving the reformer, when the first valve 30a is opened and the second valve 30b is closed so as to supply the reformed gas only to the heat source unit 10, the cooler 2 does not cool and passes the reformed gas coming out from the reforming reaction unit 1 and having a high temperature of about 600° C. to about 800° C. After the lapse of a predetermined period of time, when the second valve 30b is opened to supply the reformed gas to the water gas shift reaction unit 20, the cooler 2 cools the high temperature reformed gas coming out from the reforming reaction unit 1 to have a desired temperature.

In the illustrated embodiment, the cooler 2 can be any suitable cooler such as the atmospheric air, an air-cooled heat exchanger using a fan, a water-cooled heat exchanger using water, a combination heat exchanger using both air and water, and the like. In the case of the water-cooled heat exchanger, the cooler 2 may use water prepared for the steam-reforming reaction of the reforming reaction unit 1. In this case, water heated while passing through the cooler 2 is supplied along with the fuel to the reforming reaction unit 1, thereby enhancing the efficiency of the reforming reaction unit 1.

Meanwhile, in the reformer for the fuel cell according to an embodiment, when the water gas shift reaction unit 20 is heated to a predetermined temperature by the heat source unit 10 using the reformed gas to generate heat, the reformed gas is supplied not to the heat source unit 10 but to the water gas shift reaction unit 20. At the same time, water is additionally supplied to the water gas shift reaction unit 20, thereby making up for a deficiency of water in the water gas shift reaction.

Figure 5:
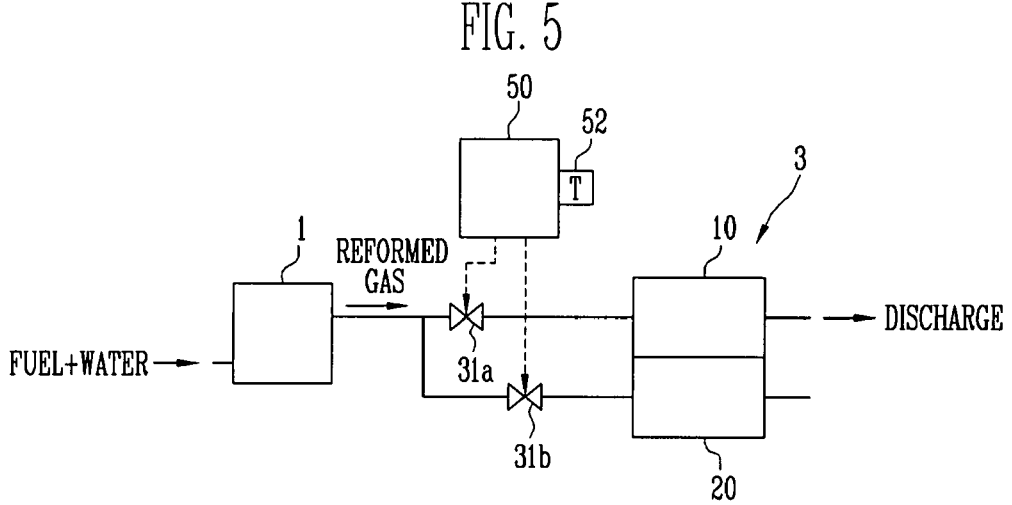
FIG. 5 is a block diagram of a reformer for a fuel cell according to a fifth embodiment.

FIG. 5 is a block diagram of a reformer for a fuel cell according to a fifth embodiment. Referring to FIG. 5, the reformer for the fuel cell according to the this embodiment includes a reforming reaction unit 1, a carbon monoxide remover 3, a heat source unit 10, a water gas shift reaction unit 20, a controller 50, a first valve 31a, and a second valve 31b. The carbon monoxide remover 3 uses a reformed gas produced in the reforming reaction unit 1 as a fuel for the heat source unit 10 so as to increase the temperature of the water gas shift reaction unit 20 when the reformer is initially driven. The controller 50 controls the first valve 31a to open/close the channel for the reformed gas supplied to the heat source unit 10, and the second valve 31b to open/close the channel for the reformed gas supplied to the water gas shift reaction unit 20. The reformer further includes a timer 52 to be set at a predetermined interval.

In the fifth embodiment, when a period of time set in the timer 52 has elapsed, the controller 50 controls the first valve 31a to close the channel to stop supplying the reformed gas to the heat source unit 10. Here, the period of time set in the timer 52 indicates a predetermined period of time after the reformer starts operating. The predetermined period of time may be set by the manufacturer of the reformer for the fuel cell. Further, the controller 50 controls the second valve 31b to open the channel to supply the reformed gas from the reforming reaction unit 1 to the water gas shift reaction unit 20. The controller 50 may include a logic circuit using a flip-flop or a partial function of a high performance microprocessor for system control.

Figure 6:
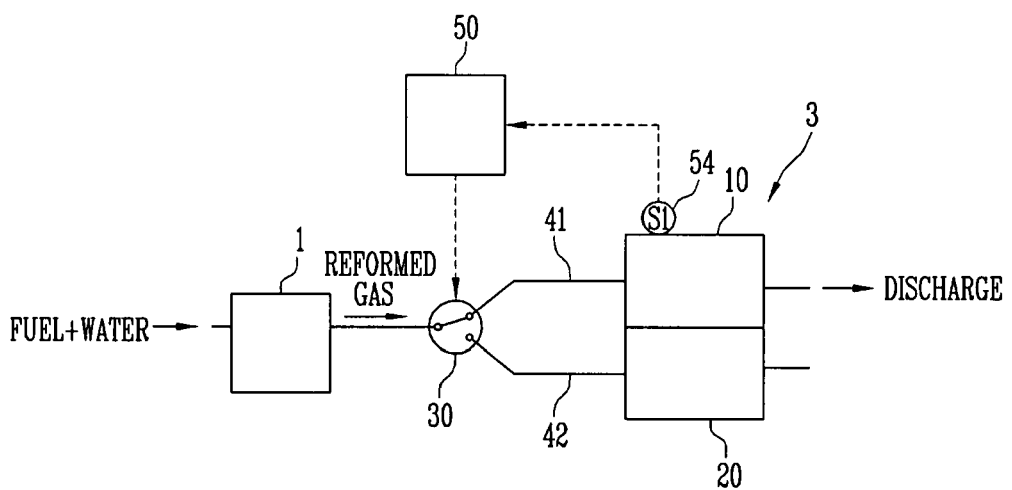
FIG. 6 is a block diagram of a reformer for a fuel cell according to a sixth embodiment.

FIG. 6 is a block diagram of a reformer for a fuel cell according to a sixth embodiment. Referring to FIG. 6, the reformer for the fuel cell according to the sixth embodiment includes a reforming reaction unit 1, a carbon monoxide remover 3, a heat source unit 10, a water gas shift reaction unit 20, a controller 50, a 3-way valve 30, and a temperature sensor 54. The carbon monoxide remover 3 uses a reformed gas produced in the reforming reaction unit 1 as a fuel for the heat source unit 10 so as to increase the temperature of the water gas shift reaction unit 20 when the reformer is initially driven. The controller 50 controls the 3-way valve 30 to open/close the channel for the reformed gas supplied to the heat source unit 10 and for the reformed gas supplied to the water gas shift reaction unit 20. The temperature sensor 54 senses the temperature of the carbon monoxide remover 3, particularly, the temperature of the water gas shift reaction unit 20.

In the sixth embodiment, the temperature sensor 54 is attached to the carbon monoxide remover 3, so that the controller 50 stops supplying the reformed gas to the heat source unit 10 and supplies the reformed gas to the water gas shift reaction unit 20 when the temperature of the carbon monoxide remover 3 increases to a predetermined temperature. For example, the controller 50 controls the 3-way valve 30 to stop supplying the reformed gas to the heat source unit and to supply the reformed gas to the water gas shift reaction unit 20 when the carbon monoxide remover 3 has a temperature of about 150° C. or higher, optionally about 200° C. or higher.

Further, the 3-way valve 30 is placed at a junction between a first pipe 41 connecting the reforming reaction unit 1 with the heat source unit 10 of the carbon monoxide remover 3 and a second pipe 42 connecting the reforming reaction unit 1 with the water gas shift reaction unit 20 of the carbon monoxide remover 3. The 3-way valve 30 controls the reformed gas passing through each pipe 41, 42. Using the 3-way valve 30, the structure of the carbon monoxide remover 3 is simplified, compared with that of when the 2-way valves are provided in the first and second pipes 41 and 42, respectively. Further, the 3-way valve 30 simplifies the control of the carbon monoxide remover 3.

Figure 7:
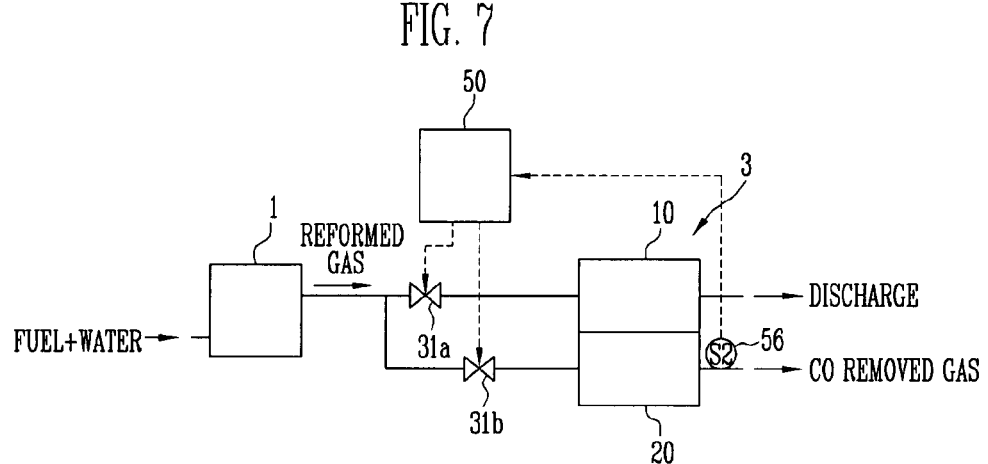
FIG. 7 is a block diagram of a reformer for a fuel cell according to a seventh embodiment.

FIG. 7 is a block diagram of a reformer for a fuel cell according to a seventh embodiment. Referring to FIG. 7, the reformer for the fuel cell according to the seventh embodiment includes a reforming reaction unit 1, a carbon monoxide remover 3, a heat source unit 10, a water gas shift reaction unit 20, a controller 50, a first valve 31a, a second valve 31b, and a concentration measurer 56. The carbon monoxide remover 3 uses a reformed gas produced in the reforming reaction unit 1 as a fuel for the heat source unit 10 so as to increase the temperature of the water gas shift reaction unit 20 when the reformer is initially driven. The controller 50 controls the first valve 31a to open/close the channel for the reformed gas supplied to the heat source unit 10, and the second valve 31b to open/close the channel for the reformed gas supplied to the water gas shift reaction unit 20. The concentration measurer 56 measures the concentration of carbon monoxide in the reformed gas coming out from the water gas shift reaction unit 20.

In the seventh embodiment, the reformed gas produced at the beginning of driving the reformer is supplied only to the heat source unit 10 to thereby increase the temperature of the water gas shift reaction unit 20. After the lapse of a predetermined period of time, the reformed gas is supplied to both the heat source unit 10 and the water gas shift reaction unit 20. Then, the concentration of carbon monoxide in the reformed gas coming out from the water gas shift reaction unit 20 is measured and compared with a reference concentration value so that a point of time to stop operating the heat source unit 10 can be determined.

Further, according to the seventh embodiment, when the concentration of carbon monoxide in the reformed gas from the water gas shift reaction unit 20, which is measured by the concentration measurer 56, is higher than the reference concentration value, the controller 50 stops supplying the reformed gas to the water gas shift reaction unit 20 and supplies the reformed gas to the heat source unit 10, thereby increasing the temperature of the heat source unit 10. This operation is repeated until the water gas shift reaction unit 20 reaches a predetermined reaction temperature.

Figure 8:
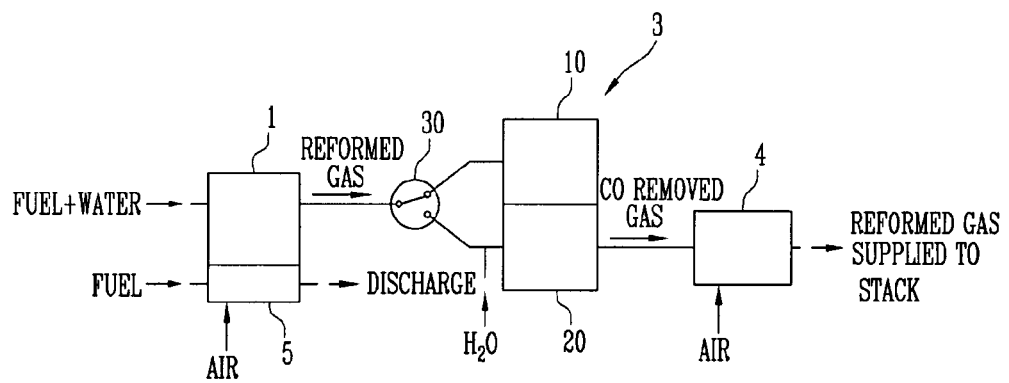
FIG. 8 is a block diagram of a reformer for a fuel cell according to an eighth embodiment.

FIG. 8 is a block diagram of a reformer for a fuel cell according to an eighth embodiment. Referring to FIG. 8, the reformer for the fuel cell according to the eighth embodiment includes a reforming reaction unit 1, a carbon monoxide remover 3, a heat source unit 10, a water gas shift reaction unit 20, a controller 50, a 3-way valve 30, and an additional carbon monoxide remover 4. The carbon monoxide remover 3 uses a reformed gas produced in the reforming reaction unit 1 as a fuel for the heat source unit 10 so as to increase the temperature of the water gas shift reaction unit 20 when the reformer is initially driven. The controller 50 controls the 3-way valve 30 to open/close the channel for the reformed gas supplied to the heat source unit 10 and for the reformed gas supplied to the water gas shift reaction unit 20. The additional carbon monoxide remover 4 further lowers the concentration of carbon monoxide in the reformed gas coming out from the carbon monoxide remover 3.

In one embodiment, the additional carbon monoxide remover 4 may include a CO oxidation (PROX) reaction unit that lowers the concentration of carbon monoxide in the reformed gas by an exothermic reaction between carbon monoxide of the reformed gas and oxygen in air. Using the PROX reaction unit 4, the concentration of the reformed gas passing through the water gas shift reaction unit 20 can be further lowered to a desired concentration of less than about 10 ppm. The PROX reaction unit 4 can use a catalyst such as Ru, Rh, Pt/Al$_2$O$_3$, TiO$_2$, ZrO$_2$, Au/Fe$_2$O$_3$, etc. The reaction of lowering carbon monoxide by the water gas shift reaction unit 20 can be represented as follows.

$$CO + H_2O \leftrightarrow CO_2 + H_2 \qquad \text{Reaction Equation 3}$$

Further, the reaction of lowering carbon monoxide by the PROX reaction unit 60 can be represented as follows.

$$CO + 1/2 O_2 \leftrightarrow CO_2$$

$$H_2 + 1/2 O_2 \leftrightarrow H_2O \qquad \text{Reaction Equation 4}$$

In certain embodiments, the PROX reaction unit 4 uses oxygen to oxidize carbon monoxide contained in the reformed gas. In such embodiments, air is separately supplied for the reaction.

According to this embodiment, the reformer for the fuel cell can further include an additional heat source unit 5 to supply heat to the reforming reaction unit 1. Here, the heat source unit 5 may include a combustor or a burner to generate heat by a combustion reaction between separate fuel and air (oxygen).

In the reformer for the fuel cell according to this embodiment, when the reformed gas passing through the water gas shift reaction unit 20 contains carbon monoxide having a high concentration enough to contaminate a fuel cell stack, the PROX reaction unit 4 additionally lowers the concentration of carbon monoxide in the reformed gas passing through the water gas shift reaction unit 20, thereby supplying the reformed gas with a desired concentration to the fuel cell stack. Thus, the reformed gas having carbon monoxide in a concentration low enough to be supplied to the stack can be supplied to an anode of the stack and used in generating electricity. In the meantime, unreacted gas containing hydrogen, which is discharged from the stack, is returned to the heat source unit 5 (e.g., the burner or the combustor) of the reforming reaction unit and recycled as the fuel for the heat source unit 5.

As described above, the reformed gas produced when the reformer is initially driven is used as the fuel for the heat source unit of preheating the water gas shift reaction unit. Thus, the temperature of the water gas shift reaction unit can quickly increase without consuming separate fuel or energy, thereby shortening the starting time of the reformer the fuel cell. Further, a large quantity of carbon monoxide contained in the reformed gas produced at the beginning of driving the reformer can be effectively removed. Furthermore, the fuel efficiency is improved.

Although a few embodiments have been shown and described, it would be appreciated by those skilled in the art that changes might be made in this embodiment without departing from the principles and spirit of the invention, the scope of which is defined in the claims and their equivalents.

What is claimed is:

1. An apparatus, comprising:
   a reactor comprising an inlet and an outlet, wherein the inlet is configured to receive hydrocarbon, and wherein the outlet is configured to discharge a mixture comprising hydrogen gas, carbon dioxide and carbon monoxide;
   a carbon monoxide remover in fluid communication with the reactor, wherein the carbon monoxide remover comprises a heater and a shift reaction unit, wherein the heater is in fluid communication with the outlet of the reactor through a first pipe, wherein the first pipe comprises a valve, and wherein the shift reaction unit is in fluid communication with the outlet through a second pipe;
   a controller electrically connected to the valve and configured to control operation of the valve, wherein the controller is also electrically connected to a timer or a concentration sensor;
   a manifold connecting the outlet of the reactor to both the shift reaction unit and the heater, wherein the manifold comprises at least one valve configured to selectively direct the mixture from the outlet either to the shift reaction unit through the second pipe or to the heater through the first pipe, wherein the heater is a cylindrical heater and wherein the shift reaction unit is formed surrounding the cylindrical heater in coaxial alignment within the carbon monoxide remover; and
   air holes penetrating the shift reaction unit such that the heater is in fluid communication with ambient air.

2. The apparatus of claim 1, wherein the controller is electrically connected to the timer, and wherein the controller is configured to control the operation of the valve using the time measured by the timer.

3. The apparatus of claim 1, wherein the controller is electrically connected to a temperature sensor, and wherein the controller is configured to control the operation of the valve using temperature measured by the temperature sensor.

4. The apparatus of claim 1 wherein the controller is electrically connected to the concentration sensor, and wherein the controller is configured to control the operation of the valve using concentration measured by the concentration sensor.

5. The apparatus of claim 1 formed as part of a self-contained fuel cell system, a fuel cell reformer module, an electronic or electrical device comprising a fuel cell, or a transportation vehicle comprising a fuel cell.

6. The apparatus of claim 1 further comprising another carbon monoxide remover configured to process a resulting mixture from the carbon monoxide remover and to remove at least part of carbon monoxide from the resulting mixture.

7. The apparatus of claim 1, wherein the heater comprises an oxidation catalyst.

8. The apparatus of claim 1, wherein the shift reaction unit comprises a shift catalyst.

9. The apparatus of claim 1 further comprising a cooler in fluid communication with the reactor and in fluid communication with the carbon monoxide remover.

10. The apparatus of claim 9, wherein the cooler comprises an air-cooled heat exchanger using a fan, a water-cooled heat exchanger using water or a combination heat exchanger using both air and water.

11. The apparatus of claim 1, wherein an external surface of an inner pipe body forming the cylindrical heater comprises a plurality of protrusions extending from the heat source unit toward the inside of the water gas shift reaction unit.

12. The apparatus of claim 1, wherein the shift reaction unit comprises a high temperature water gas shift reaction unit and a low temperature water shift reaction unit, and wherein the high temperature water gas shift reaction unit and the low temperature water gas shift reaction unit are connected through a second pipe.

13. An apparatus, comprising:
   an inlet configured to receive a mixture comprising hydrogen gas, carbon dioxide and carbon monoxide;
   a carbon monoxide remover in fluid communication with the inlet, wherein the carbon monoxide remover comprises a heater and a shift reaction unit;
   a valve located between the inlet and the carbon monoxide remover and between the inlet and the heater, wherein the valve is configured to selectively direct the mixture from the inlet to either the carbon monoxide remover or the heater;
   a controller comprising a controller electrically connected to the valve, wherein the controller is also electrically connected to either a timer or a concentration sensor;
   a manifold connecting the outlet of the reactor to both the shift reaction unit and the heater, wherein the manifold comprises at least one valve configured to selectively direct the mixture from the outlet either to the shift reaction unit or to the heater, wherein the heater is a cylindrical heater and wherein the shift reaction unit is formed surrounding the cylindrical heater in coaxial alignment within the carbon monoxide remover; and
   air holes penetrating the shift reaction unit such that the heater is in fluid communication with ambient air.

14. The apparatus of claim 13, wherein the controller is configured to control the operation of the valve based on one or more inputs selected from the group consisting of time from initiation of operation of the apparatus, time from receipt of the mixture at the inlet, temperature of the mixture at the inlet, and concentration of carbon monoxide in the mixture received through the inlet.

* * * * *